(12) United States Patent
Zhu et al.

(10) Patent No.: US 9,534,116 B2
(45) Date of Patent: *Jan. 3, 2017

(54) FLAME RETARDANT POLYLACTIC ACID COMPOUNDS

(71) Applicant: PolyOne Corporation, Avon Lake, OH (US)

(72) Inventors: Shixiong Zhu, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,332

(22) PCT Filed: Oct. 14, 2013

(86) PCT No.: PCT/US2013/064843
§ 371 (c)(1),
(2) Date: Apr. 13, 2015

(87) PCT Pub. No.: WO2014/062573
PCT Pub. Date: Apr. 24, 2014

(65) Prior Publication Data
US 2015/0274966 A1 Oct. 1, 2015

Related U.S. Application Data

(60) Provisional application No. 61/715,086, filed on Oct. 17, 2012.

(51) Int. Cl.
*C08L 69/00* (2006.01)
*C08L 67/04* (2006.01)
*C08J 5/00* (2006.01)

(52) U.S. Cl.
CPC ........ *C08L 69/00* (2013.01); *C08J 5/00* (2013.01); *C08L 67/04* (2013.01); *C08J 2367/04* (2013.01); *C08J 2369/00* (2013.01); *C08J 2385/02* (2013.01); *C08J 2427/18* (2013.01); *C08J 2433/06* (2013.01); *C08J 2467/04* (2013.01); *C08J 2469/00* (2013.01); *C08L 2201/02* (2013.01); *C08L 2205/035* (2013.01); *C08L 2207/04* (2013.01)

(58) Field of Classification Search
CPC .............. C08L 69/00; C08L 67/04; C08J 5/00
See application file for complete search history.

(56) References Cited

U.S. PATENT DOCUMENTS

| | | | |
|---|---|---|---|
| 5,300,576 A | 4/1994 | Nemphos et al. | |
| 5,321,064 A | 6/1994 | Vaidya et al. | |
| 5,446,078 A | 8/1995 | Vaidya et al. | |
| 5,847,011 A | 12/1998 | Ajioka et al. | |
| 5,952,450 A | 9/1999 | Ishihara et al. | |
| 6,022,550 A | 2/2000 | Watanabe | |
| 6,583,232 B1 | 6/2003 | Brown | |
| 6,605,681 B1 | 8/2003 | Villalobos et al. | |
| 6,869,985 B2 | 3/2005 | Mohanty et al. | |
| 6,984,694 B2 | 1/2006 | Blasius, Jr. et al. | |
| 7,160,937 B2 | 1/2007 | Shibuya et al. | |
| 7,256,223 B2 | 8/2007 | Mohanty et al. | |
| 7,268,190 B2 | 9/2007 | Ohme et al. | |
| 7,271,212 B2 | 9/2007 | Oguni et al. | |
| 7,354,656 B2 | 4/2008 | Mohanty et al. | |
| 7,368,511 B2 | 5/2008 | Hale et al. | |
| 7,504,452 B2 | 3/2009 | Hayata et al. | |
| 7,511,091 B2 | 3/2009 | Itagaki et al. | |
| 7,553,900 B2 | 6/2009 | Hayata et al. | |
| 7,645,850 B2 | 1/2010 | Freitag et al. | |
| 7,645,852 B2 | 1/2010 | Terado et al. | |
| 7,671,169 B2 | 3/2010 | Mullen et al. | |
| 7,767,744 B2 | 8/2010 | Yao et al. | |
| 7,863,382 B2 | 1/2011 | Ishii et al. | |
| 8,030,382 B2 | 10/2011 | Endo et al. | |
| 8,030,402 B2 | 10/2011 | Hirasawa | |
| 8,044,134 B2 | 10/2011 | Chung et al. | |
| 8,071,694 B2 | 12/2011 | Yu et al. | |
| 8,097,273 B2 | 1/2012 | Fukuhira et al. | |
| 8,133,943 B2 | 3/2012 | Cho et al. | |
| 8,304,048 B2 | 11/2012 | Ikeda et al. | |

(Continued)

FOREIGN PATENT DOCUMENTS

JP 2008106091 5/2008
JP 2008222987 9/2008

(Continued)

OTHER PUBLICATIONS

NatureWorks, "Technology Focus Report: Blends of PLA with Other Thermoplastics" (2007).
Sokolowski et al., "Joncryl ADR Chain Extenders" (Jul. 24, 2009).

*Primary Examiner* — John Uselding
(74) *Attorney, Agent, or Firm* — Michael J. Sambrook

(57) ABSTRACT

A significant disadvantage of the use of polylactic acid (PLA), lack of flame retardance, has been overcome by the use of specific combinations of either polycarbonate or polyphosphonate-co-carbonate in combination with non-halogenated flame retardants of polyphosphazene or phosphate ester such as resorcinol bis (diphenyl phosphate) or metal hypophosphite, a drip suppressant, and optionally an inorganic synergist of either zinc borate or talc or both and optionally other ingredients. The compound achieves a UL 94 rating of V-0 or V-1 at 1.6 mm.

17 Claims, No Drawings

(56) References Cited

U.S. PATENT DOCUMENTS

| | | |
|---|---|---|
| 8,304,476 B2 | 11/2012 | Yamanaka et al. |
| 8,410,214 B2 | 4/2013 | Hayata et al. |
| 8,445,593 B2 | 5/2013 | Ishii et al. |
| 8,623,945 B2 | 1/2014 | Smit et al. |
| 8,765,865 B2 | 7/2014 | Zhu et al. |
| 8,791,192 B2 | 7/2014 | Hironaka et al. |
| 9,023,922 B2 | 5/2015 | Zhao et al. |
| 9,062,201 B2 | 6/2015 | Zhu et al. |
| 2007/0129511 A1* | 6/2007 | Freitag .................. 525/538 |
| 2007/0197740 A1* | 8/2007 | Hayata et al. ............. 525/439 |
| 2007/0299227 A1 | 12/2007 | Gopferich et al. |
| 2007/0299238 A1 | 12/2007 | Gopferich et al. |
| 2007/0299240 A1 | 12/2007 | Gopferich et al. |
| 2008/0153940 A1 | 6/2008 | Scheer et al. |
| 2009/0043013 A1 | 2/2009 | Stahl et al. |
| 2009/0221755 A1 | 9/2009 | Aoki et al. |
| 2009/0239983 A1* | 9/2009 | Nodera .................. C08L 69/00 524/145 |
| 2010/0222486 A1 | 9/2010 | Matsuno et al. |
| 2010/0227963 A1 | 9/2010 | Hironaka et al. |
| 2010/0249290 A1* | 9/2010 | Feldermann et al. ........ 524/127 |
| 2011/0034607 A1 | 2/2011 | Zhu et al. |
| 2011/0294928 A1* | 12/2011 | Nodera .................. C08L 67/04 524/73 |
| 2012/0041086 A1 | 2/2012 | Sampath et al. |
| 2012/0121843 A1 | 5/2012 | Lebel et al. |
| 2012/0220711 A1 | 8/2012 | Zhu et al. |
| 2012/0289625 A1 | 11/2012 | Matsuno et al. |
| 2014/0107241 A1 | 4/2014 | Liu |
| 2014/0200295 A1 | 7/2014 | Liu |
| 2014/0235740 A1 | 8/2014 | Liu |

FOREIGN PATENT DOCUMENTS

| | | |
|---|---|---|
| JP | 2009079196 | 4/2009 |
| JP | 2009096881 | 5/2009 |
| JP | 2010144084 | 7/2010 |
| JP | 2011057803 | 3/2011 |
| KR | 1020100079518 | 7/2010 |
| KR | 1020110000440 | 1/2011 |

* cited by examiner

FLAME RETARDANT POLYLACTIC ACID COMPOUNDS

CLAIM OF PRIORITY

This application claims priority from U.S. Provisional Patent Application Ser. No. 61/715,086 filed on Oct. 17, 2012, which is incorporated by reference.

FIELD OF THE INVENTION

This invention relates to new compounds including polylactic acid and having increased heat resistance and flame retardance to improve structural integrity during use of the compound containing polylactic acid.

BACKGROUND OF THE INVENTION

Plastic articles have replaced glass, metal, and wood articles because plastic can be engineered to not shatter, rust, or rot. The durability of plastic articles also creates a disposal dilemma. Also, many plastic resins are made from petrochemicals, which have long-term supply and cost issues.

Therefore, there is a considerable effort underway to find biologically-derived and sustainable sources of thermoplastic resins, preferably those which degrade or compost to also resolve the disposal dilemma.

Polylactic acid, also known as polylactide or PLA, has been explored as a thermoplastic resin from biologically sustainable origins which can replace petrochemically originated resins.

SUMMARY OF THE INVENTION

While polylactic acid is probably one of the three most popular bio-derived resins being explored, it has the distinct disadvantage, as when compared to the fossil-derived resins it is meant to replace, that it has a poor heat deflection temperature.

Heat deflection temperature (HDT) is a measurement of deflection of a sample under flexural load using the protocol of ASTM D648. The flexural load can be either of two settings. For purposes of this invention, 66 pounds per square inch (psi) or 455 kilo-Pascals (kPa) will be used for comparative measurements of heat deflection.

The problem with polylactic acid is that it has a heat deflection temperature under a 455 kPa flexural load of about 55° C. or 131° F. In other words, inside an automobile on an Arizona summer day, PLA would not be sturdy enough to be used as a thermoplastic resin molded into a passenger compartment component, as the case for an electronic handheld device laying on the seat, or as a piece of packaging containing perishable food in a grocery bag on the floor inside the automobile.

The problem with PLA is that it does not have sufficient heat resistance to allow it to be considered as a practical replacement for fossil-derived thermoplastic resins now used in many common plastic articles.

Another problem with PLA is that it is not suitably flame retardant. As with many other thermoplastic resins, other chemicals are needed to be included in the thermoplastic compound in order for that compound to be flame retardant, especially to achieve a V-1 or V-0 rating when tested using the Underwriters' Laboratories (UL) 94 test.

Within the category of flame retardants, for regulatory reasons, there is a desire for the flame retardants to have essentially no halogen content. Within recent years, non-halogenated flame retardants have become more available.

Another problem with PLA is that it is not suitably tough, i.e., resistant to impact. Brittle thermoplastic compounds, even if heat resistant and flame retardant, are not suitable for commercial uses.

What the art needs is a heat resistant, flame retardant, impact resistant polylactic acid compound, in order that such compound can replace heat resistant, flame retardant, impact retardant thermoplastic compounds in which the thermoplastic resin is made from petrochemical sources obtained via mining or drilling into the earth.

The present invention solves that problem by compounding PLA with particular types of flame retardants and a drip suppressant and optionally an impact modifier, in order that the PLA compound has sufficient heat resistance, flame retardance, and optionally impact toughness to permit the PLA compound to replace a conventional thermoplastic compound.

Optionally, the PLA compound can also include an oligomeric chain extender which is believed to react with the PLA resin to provide additional impact toughness.

The art has had a long-felt need for solving the heat resistance problem. Published literature of NatureWorks, LLC, a principal manufacturer of PLA, reports at www.natureworksllc.com that adding as much as 50% by weight of acrylonitrile-butadiene-styrene (ABS) to PLA to create a 50-50 PLA-ABS blend improves HDT by as little as 2° C. over the HDT of pure PLA polymer resin. Adding as much as 80% by weight of ABS to PLA does result in an improvement in HDT by 30° C., but at that mixture, it is actually more of an ABS polymer being modified by PLA.

Moreover, the art has had a long-felt need for solving the heat resistance problem, and it has been commonly characterized in some industries that a PLA compound should preferably have at least a 65° C. HDT at 66 psi to be a practical thermoplastic compound of both biologically sustainable origin and practical commercial use. At long last, the present invention has discovered also suitable combinations of reactants to achieve, and exceed, that goal of 65° C. at 66 psi.

The art needs a means to increase the actual HDT values for PLA, while also retaining the resulting compound as principally significantly a PLA compound.

For purposes of this invention, the PLA should be a "significant component", meaning that PLA is present in at least about thirty weight percent (30%) of the compound.

Non-halogen flame retardant additives for thermoplastic compounds can be selected from the categories of a variety of phosphorus-containing chemicals. Non-limiting examples of phosphorus-containing chemicals include polyphosphates, phosphinates, polyphosphonates, phosphonates, phosphates, polyphosphonites, phosphonite salts, hypophosphite, hypophosphinite, phosphonite, phosphite, phosphorus oxide, phosphoramide, phosphoramidate, phosphorus nitrile, phospham, phosphoryl nitrile, phosphorus nitride amide, imidophosphazene, polyphosphazene, phosphazene, phosphorus oxynitride, organophosphates, red phosphorus, and combinations thereof.

Among them, it has been found that a copolymer of polyphosphonate and polycarbonate not only provides suitable flame retardance when the other categories of phosphorus-containing chemicals failed, but also that such copolymer, also called polyphosphonate-co-carbonate, provided a boost to the heat resistance of the PLA compound.

It has been found also, unexpectedly, that the combination of PLA, polyphosphonate-co-carbonate or polycarbonate, polyphosphazene, a phosphate ester such as resorcinol bis(diphenyl phosphate) or a metal hypophosphite, optionally an inorganic synergist, a drip suppressant, and optionally an impact modifier, can increase the HDT of a PLA compound to more than 60° C. with a V-0 UL94 rating @ 3.2 mm thickness.

Alternatively, one can choose another of the non-halogen flame retardant candidates listed above, apply the principles identified in this document, and arrive at other combinations of PLA, carbonate polymers, non-halogen flame retardants, and optionally, inorganic synergist(s), drip suppressant(s), and impact modifier(s), can increase the HDT of a PLA compound to more than 60° C. with a V-0 UL94 rating @ 3.2 mm thickness.

One aspect of the present invention is a heat resistant, flame retardant polylactic acid compound, comprising (a) polylactic acid; (b) a carbonate polymer selected from the group consisting of (i) polycarbonate, (ii) polyphosphonate-co-carbonate, and (iii) a combination of them; (c) a non-halogenated flame retardant selected from the group consisting of polyphosphates, phosphinates, polyphosphonates, phosphonates, phosphates, polyphosphonites, phosphonite salts, hypophosphite, hypophosphinite, phosphonite, phosphite, phosphorus oxide, phosphoramide, phosphoramidate, phosphorus nitrile, phospham, phosphoryl nitrile, phosphorus nitride amide, imidophosphazene, polyphosphazene, phosphazene, phosphorus oxynitride, organophosphates, red phosphorus, and combinations thereof; (d) a fluoropolymer drip suppressant; (e) optionally, an inorganic synergist selected from the group consisting of (i) zinc borate, (A) if the carbonate polymer is polycarbonate, if the flame retardant is more than 10 weight percent of the compound and if an optional oligomeric chain extender is also present, (B) if the carbonate polymer is polyphosphonate-co-carbonate and if the amount of flame retardant is 10 weight percent or less; (ii) talc, if the carbonate polymer is polycarbonate and if the combination of polyphosphazene and bisphosphate ester is more than 10 weight percent of the compound; and (iii) a combination of them, if the carbonate polymer is polycarbonate, if the flame retardant is more than 10 weight percent of the compound and if the optional oligomeric chain extender is absent; and (iv) neither of them, if the carbonate polymer is polyphosphonate-co-carbonate, if the amount of polyphosphazene is 10 weight percent or less, and if the compound requires a V-0 UL flame retardance rating at 0.8 mm thickness.

Another aspect of the present invention is a plastic article formed from the compound described immediately above.

Features and advantages of the compound of the present invention will be further explained with reference to the embodiments.

EMBODIMENTS OF THE INVENTION

PLA

PLA is a well-known biopolymer, having the following monomeric repeating group in Formula I:

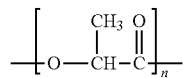

The PLA can be either poly-D-lactide, poly-L-lactide, or a combination of both. PLA is commercially available from NatureWorks, LLC located in all manufacturing regions of the world. Any grade of PLA is a candidate for use in the present invention. Currently, grades 4042D and 4032D are preferred. The number average molecular weight of PLA can be any which is currently available in a commercial grade or one which is brought to market in the future. To the extent that a current end use of a plastic article could benefit from being made from PLA and from having the heat resistance of the compound of the present invention, then that suitable PLA should be the starting point for constructing the compound of the present invention.

Polycarbonate

Any polycarbonate is a candidate for use in the compound, whether obtained from petrochemical or bio-derived sources, whether virginal or recycled.

Polycarbonates can be branched or linear, a mixture of them being preferred in this invention. Polycarbonates can be aliphatic or aromatic, with the latter being preferred in this invention. Without undue experimentation, one of ordinary skill in the art can select a polycarbonate matrix based on considerations of cost, manufacturing technique, physical properties, chemical properties, etc.

Commercial manufacturers of polycarbonate are Sabic, Bayer, Teijin, Dow, and others.

Polyphosphonate-Co-Carbonate

Polyphosphonate-co-carbonate is a copolymer described in U.S. Pat. No. 7,645,850 (Freitag), which disclosure is incorporated by reference herein.

As explained in U.S. Pat. No. 7,645,850, polyphosphonate-co-carbonate is formed from at least one phosphonate oligomer or polyphosphonate block covalently linked to polycarbonate, wherein the covalent linkages are between the at least one phosphonate oligomer or polyphosphonate and the polycarbonate to provide a copolymer having a single glass transition temperature (Tg). Though Freitag discloses block copolymers, random copolymers can also be formed.

Formula II identifies the structure of the phosphonate oligomer or polyphosphonate block.

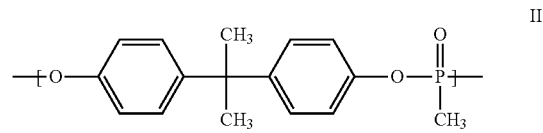

It should also be understood from the description below that Formula II also identifies the type of polyphosphonates also useful as non-halogenated flame retardants without the copolymerization with carbonate moieties.

The polyphosphonate-co-carbonate can have a weight average molecular weight (according PC standards) ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%.

For a preferred polyphosphonate-co-carbonate, the weight average molecular weight is about 31,000; the glass transition temperature is about 124° C.; a percentage phosphorus content is about 5 weight percent of the polyphosphonate-co-carbonate; and the Limiting Oxygen Index is believed to be about 44%. For purposes of the examples below, this preferred polyphosphonate-co-carbonate will be denominated "FRX CO 45", and is now known in the market at Nofia™ C04000.

Two grades of polyphosphonate-co-carbonate have been publicized by FRX Polymers, Inc. of Chelmsford, Mass., USA: FRX CO 35 (now known as Nofia™ CO3000) and FRX CO 60 (now known as Nofia™ CO6000). The website of FRX Polymers identifies a product data sheet for the FRX CO 35 grade. Both of these grades are suitable for use in this invention, because they provide a non-halogen flame retardance and contribute to the improvement in heat resistance. Any grade between them is also acceptable for use, such as FRX CO 45 if available commercially. Alternatively, the polyphosphonate-co-carbonate can be a blend of two different polyphosphonate-co-carbonates.

U.S. Pat. No. 7,645,850 has identified that polyphosphonate-co-carbonate contributes to impact strength better than polyphosphonate homopolymer. As the examples identify below, the present invention has been found to require a separate ingredient to provide sufficient impact toughness for use in commercially suitable durable PLA compounds.

Another polyphosphonate can be poly(m-phenylene methylphosphonate) (CAS No. 63747-58-0), such as disclosed in U.S. Pat. No. 4,374,971 (Schmidt et al.), one version of which is available from ICL Industrial Products or a metal phosphonate such as published as PCT publication WO 2011/163207, one version of which is commercially available from ICL-IP America Inc.

Polyphosphazene

In certain embodiments, one can include polyphosphazene flame retardants in the thermoplastic compounds of the invention because polyphosphazene flame retardants have excellent hydrolytic stability, better than bisphosphate esters, and also better than polyphosphonates.

U.S. Pat. No. 6,518,336 (Yabuhara et al.) and U.S. Pat. No. 6,743,841 (Shimizu et al.), both of which are incorporated by reference herein, disclose non-halogenated polyphosphazenes which are candidates for use in this invention. Briefly, U.S. Pat. No. 6,518,336 discloses four types of polyphosphazenes.

(1) Cyclic polyphosphazenes represented by the Formula (1)

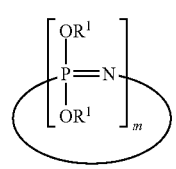

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group.

(2) Straight-chain polyphosphazenes represented by the Formula (2)

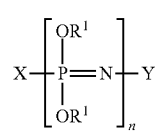

wherein n is an integer of 3 to 1000, $R^1$ is as defined above, X represents a group $-N=P(OR^1)_3$ or a group $-N=P(O)OR^1$, and Y represents a group $-P(OR^1)_4$ or a group $-P(O)(OR^1)_2$.

(3) Crosslinked polyphosphazenes wherein at least one of the foregoing phosphazenes (1) and (2) is crosslinked with at least one crosslinking group selected from the group consisting of o-phenylene, m-phenylene, p-phenylene, biphenylene, and a group represented by

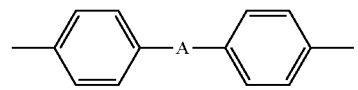

wherein A is a group $-SO_2-$, a group $-S-$, a group $-O-$ or a group $-C(CH_3)_2-$, each of said crosslinking groups being interposed between the two oxygen atoms left after the elimination of group $R^1$ from the phosphazene (1) or (2), and the number of the $R^1$ groups in the crosslinked phosphazene being 50 to 99.9% based on the total number of $R^1$ groups in the phosphazene prior to the crosslinking.

(4) At least one polyphosphazene selected from the group consisting of cyclic polyphosphazenes represented by formula (3)

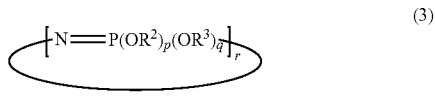

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfill the requirements that p>0, q. 0, and p+q=2; and r is an integer of 3 to 25, and a straight-chain polyphosphazene represented by the formula (4)

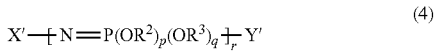

wherein $R^2$, $R^3$, p and q are as defined above; s is an integer of 3 to 1000; X' is a group $-P(OR)41$ a group $-P(OR^2)_3(OR^3)$, a group $P(OR^2)_2(OR^3)_2$, a group $-P(OR^2)(OR^3)_3$, a group $-P(OR^3)_4$, a group $P(O)(OR^2)_2$, a group $-P(O)(OR^2)(OR^3)$, or a group $-P(O)(OR^3)_2$; and Y' is a group $-N=P(OR^2)_3$, a group $-N=P(OR^2)_2(OR^3)$, a group $N=P(OR^2)(OR^3)_2$, a group $-N=P(OR^3)_3$, a group $-N=P(O)OR^2$ or a group $N=P(O)OR^3$.

The foregoing examples of the non-halogenated polyphosphazenes can be used either alone or in combination.

Specific examples of the cyclic polyphosphazene (1) and the straight-chain polyphosphazene (2) include a mixture of phosphazenes in which phenoxy groups and/or alkoxy groups are introduced as substituents and which are obtainable from a mixture of cyclic and straight-chain chlorophosphazenes, e.g., hexachlorocyclotriphosphazene, octachlorocyclotetra-phosphazene and the like, prepared by reacting ammonium chloride and phosphorus pentachloride at about 120 to about 130° C.; and hexaphenoxycyclotriphosphazene, octaphenoxycyclotetraphosphazene, decaphenoxycyclo-pentaphosphazene, hexaalkoxycyclotriphosphazene, octaalkoxycyclotetraphosphazene, decaalkoxycyclopentaphosphazene and like cyclic phosphazenes obtained by isolating, from the above mixture of chlorophosphazenes, hexachlorocyclotriphosphazene, octachlorocyclotetraphosphazene, decachlorocyclopenta-phosphazene or like single substances, followed by substitution with a phenoxy group and/or an alkoxy group.

Specific examples of the straight-chain polyphosphazenes (2) include those obtained by heating (at 220 to 250° C.) hexachlorocyclotriphosphazene for ring-opening polymerization to give dichlorophosphazene, followed by substitution with a phenoxy group and/or an alkoxy group.

Specific examples of the crosslinked polyphosphazenes (3) are phenoxyphosphazene having 4,4'-sulfonyldiphenylene(bisphenol-S residue) group-crosslinked structure, phenoxyphosphazene having 2,2-(4,4'-diphenylene)isopropylidene group-crosslinked structure, phenoxyphosphazene having 4,4'-oxydiphenylene group-crosslinked structure, phenoxyphoshazene having 4,4'-thiodiphenylene group-crosslinked structure, phenoxyphosphazene having 4,4'-diphenylene group-crosslinked structure, etc.

Specific examples of the polyphosphazenes (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxy-hepta-phenoxycyclotetraphosphazene, dicyanophenoxyhexaphenoxycyclotetraphosphazene, tricyanophenoxypentaphenoxy-cyclotetraphosphazene, tetracyanophenoxytetraphenoxy-cyclotetraphosphazene, pentacyanophenoxytriphenoxycyclotetraphosphazene, hexacyanophenoxydiphenoxy-cyclotetraphosphazene, heptacyanophenoxymonophenoxy-cyclotetraphosphazene and like cyclotetraphosphazenes; cyclopentaphosphazenes having both cyanophenoxy and phenoxy groups as substituents; and like cyclic phosphazenes; and straight-chain phosphazenes having both cyanophenoxy and phenoxy groups as substituents.

Among these polymers, preferred are a mixture of polyphenoxyphosphazenes which have phenoxy groups as substituents and which are obtainable from a mixture of cyclic and straight-chain chlorophosphazenes, phenoxyphosphazene having 4,4'-sulfonyldiphenylene-crosslinked structure; phenoxyphosphazene having 2,2-(4,4'-diphenylene)-isopropylidene group-crosslinked structure; and polyphosphazenes having both cyanophenoxy and phenoxy groups as substituents.

Commercially available polyphosphazenes can be purchased from Otsuka Chemical Co., Ltd. of Osaka, Japan. Presently preferred as a flame retardant is SPB 100 and SPB-L polyphosphazene from Otsuka. Also useful in this invention are (a) functionalized polyphosphazenes having hydroxyl or vinyl functional groups and (b) crosslinked polyphosphazenes, such as crosslinked SPB 100 polyphosphazene, as taught by Teijin Ltd. in Japanese patent publication JP01-124616 A (1989).

Phosphate Esters

In other embodiments of this invention, phosphate esters such as resorcinol bis (diphenyl phosphate), bisphenol-A diphosphate (BPA-DP), tricresyl phosphate, and other phosphate esters can be used as the non-halogenated flame retardant. Resorcinol bis (diphenyl phosphate) has a Chemical Abstract Services Number of CAS #57583-54-7. One commercial source of resorcinol bis (diphenyl phosphate) is REOFOS brand flame retardant from Chemtura. A commercial source of another bisphosphate ester is WSFR-PX220 bisphosphate ester from Zhejiang Wansheng Co. Ltd of China.

Other Non-Halogenated Flame Retardants

In addition to polyphosphonate copolymers and polyphosphazenes, other non-halogenated flame retardants can be used in the present invention, without undue experimentation by a person having ordinary skill in the art of polymer compounding, applying the principles identified in this document. Among the candidates are polyphosphates, phosphinates, polyphosphonates, phosphonates, phosphates, polyphosphonites, phosphonite salts, hypophosphite, hypophosphinite, phosphonite, phosphite, phosphorus oxide, phosphoramide, phosphoramidate, phosphorus nitrile, phospham, phosphoryl nitrile, phosphorus nitride amide, imidophosphazene, polyphosphazene, phosphazene, phosphorus oxynitride, organophosphates, and red phosphorus, and combinations thereof, and any other phosphorus-containing flame retardant identified at www.halogenfree-flameretardants.com.

For example, the Exolit™ range of organic phosphinates from Clariant or the Phoslite™ range of metal hypophosphites can be used in the invention.

Optional Inorganic Synergist Agent

Talc is well known as a functional filler useful in polymer compounds. Talc is a naturally occurring mineral, identified generally as a hydrous magnesium silicate having a Chemical Abstract Services Number of CAS #14807-96-6. Its formula is $3MgO.4SiO_2.H_2O$.

Talc is available from a number of commercial sources. Non-limiting examples of such talc useful in this invention are Jetfil™ brand talcs from Luzenac America, Flextalc™ brand talcs from Specialty Minerals, Talcron™ brand talcs from Mineral Technologies, Inc., and Mistron® brand talcs from Luzenac America.

Talc can have particle sizes ranging from about 0.5 μm to about 20 μm and preferably from about 0.7 μm to about 7 μm.

Zinc borate is another well known functional filler. Zinc borate can have particle sizes ranging from about 1 μm to about 15 μm and preferably from about 1.5 μm to about 12 μm.

Either talc, zinc borate, or both are used in the invention as inorganic synergists to assist the chosen flame retardant by means of drip suppression and inorganic char formation, a mechanism of flame retardance known to those having ordinary skill in the art.

Alternatively, if a combination of polyphosphonate-co-carbonate and polyphosphazene is selected, embodiments of the invention do not require any inorganic synergist to be present.

Drip Suppressant

Any conventional drip suppressant is a candidate for use in the present invention because drip suppressants assist in the compound retain integrity during burning.

As identified in the published literature from Kaneka Corporation, a polycarbonate-containing compound using a siloxane/(meth)acrylate core/shell impact modifier can benefit from the addition of a drip suppressant, such as polytetrafluoroethylene (PTFE). Compounds of the present invention preferably include minor amounts of PTFE.

An additional benefit of the use of PTFE is that it is a known lubricant to assist in processing of the compound during melt-mixing or during final shaping of the plastic article.

Even though PTFE is fluorinated, the very minor amount present, if any, in compounds of the present invention does not disqualify such compounds from being considered as non-halogenated flame retardant compounds.

Optional Impact Modifier

Any conventional impact modifier is a candidate for use in compounds of the present invention. Core/shell impact modifiers, rubbery impact modifiers, etc. are suitable.

Of the various impact modifier candidates, siloxane grafted impact modifier can be used, namely, Kane Ace MR-01 grade Siloxane Flame Retardant from Kaneka Corporation. From Kaneka Corporation, it is known that the MR-01 copolymer flame retardant has a core of siloxane and a shell of acrylic esters. Because the polyphosphonate-co-carbonate is a polycarbonate copolymer, this MR-01 core/shell siloxane/(meth)acrylate copolymer impact modifier is especially suitable for providing both impact toughness and additional flame retardance to the compound.

Alternatively, one can use METABLEN® S2030 impact modifier from Mitsubishi Rayon Inc.

Optional Chain Extender

Optionally, one can increase physical performance of the compounds of the present invention by also including an oligomeric chain extender as an ingredient.

The oligomeric chain extender useful for forming a preferred compound is an epoxy functional low molecular weight styrene-acrylate copolymer such as those disclosed in U.S. Pat. No. 6,605,681 (Villalobos et al.) and U.S. Pat. No. 6,984,694 (Blasius et al.), incorporated by reference herein.

Stated another way, the oligomeric chain extender is the polymerization product of (i) at least one epoxy-functional (meth)acrylic monomer; and (ii) at least one styrenic and/or (meth)acrylic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000. Preferably, the oligomeric chain extender a polydispersity index of from about 1.5 to about 5.

Of possible candidates of epoxy-functional styrene-acrylate chain extenders, Joncryl® brand chain extender oligomers are preferred, commercially available from BASF (formerly Johnson Polymers) of Milwaukee, Wis. Various grades available and useful are ADR-4300, ADR-4370, and ADR-4368, which are all solids. Alternatively, one can use liquid grades, namely: ADR-4380, ADR-4385, and ADR-4318.

Other commercial chain extenders include carbodiimides which can also be used as an optional ingredient. One commercial carbodiimide is Carbodilite™ chain extender from Nisshinbo Chemical Inc. Another commercial carbodiimide is Stabaxol® chain extender from Rhein Chemie.

Other Optional Additives

The compounds of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fire and flame retardants and smoke suppressants; initiators; lubricants; pigments, colorants and dyes; plasticizers; processing aids; release agents; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire compound when the carbonate polymer is polycarbonate.

Table 2 shows acceptable, desirable, and preferable ranges of ingredients useful in the present invention, all expressed in weight percent (wt. %) of the entire compound when the carbonate polymer is polyphosphonate-co-carbonate.

TABLE 1

|  | Acceptable | Desirable | Preferable |
|---|---|---|---|
| PLA | 30-39 | 30-38 | 30-37 |
| Carbonate Polymer |  |  |  |
| Polycarbonate | 35-60 | 35-50 | 40-50 |
| Flame Retardant(s) | 2-30 | 5-25 | 5-20 |
| Drip Suppressant | 0.1-2.0 | 0.5-1.5 | 0.5 |
| Optional Inorganic Synergists |  |  |  |
| Talc | 0-10 | 2-8 | 2-4 |
| Zinc Borate | 0-10 | 2-8 | 2-4 |
| Optional Ingredients |  |  |  |
| Optional Siloxane/(meth)acrylate Impact Modifier | 0-12 | 0-11 | 0-10 |
| Epoxy Functional Styrene-Acrylate Oligomeric Chain Extender | 0-2 | 0.5-2 | 0.5-1.5 |
| Other Optional Additives | 0-10 | 0-10 | 0-10 |

TABLE 2

|  | Acceptable | Desirable | Preferable |
|---|---|---|---|
| PLA | 30-39 | 30-38 | 30-37 |
| Carbonate Polymer |  |  |  |
| Polyphosphonate-co-carbonate | 40-70 | 50-65 | 50-60 |
| Flame Retardant(s) | 2-30 | 3-20 | 5-10 |
| Drip Suppressant | 0.1-2.0 | 0.5-1.5 | 0.5 |
| Optional Inorganic Synergists |  |  |  |
| Talc | 0-10 | 2-8 | 2-4 |
| Zinc Borate | 0-10 | 2-8 | 2-4 |
| Optional Ingredients |  |  |  |
| Optional Siloxane/(meth)acrylate Impact Modifier | 0-12 | 0-11 | 0-10 |
| Epoxy Functional Styrene-Acrylate Oligomeric Chain Extender | 0-2 | 0.5-2 | 0.5-1.5 |
| Other Optional Additives | 0-10 | 0-10 | 0-10 |

Processing

The preparation of compounds of the present invention is uncomplicated and can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 1000 revolutions per minute (rpm), and preferably from about 300 to about 700 rpm. Typically, the output from the extruder is pelletized for later shaping by extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later shaping by extrusion or molding into polymeric articles.

During continuous or batch processing, if present, the oligomeric chain extender reacts with the PLA or the polyphosphonate-co-carbonate or polycarbonate or both to form the compound of the present invention.

Optionally but preferably, prior to batch or continuous melt-mixing, one can dry the ingredients to help reduce the possibility of a moisture-activated degradation or reaction in the melt-mixing vessel. Alternatively, one can use other ways to reduce degradation possibilities, such as incorporating a moisture scavenger or desiccant into the formulation, applying a vacuum within the melt-mixing vessel, etc. Any of these techniques, or combination of techniques, results in the ingredients being dried before or during melt-mixing.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Regardless of drying or other techniques during melt-mixing, it has been found that drying the compound before molding can have a direct effect on performance properties, including heat deflection temperature. As the Examples below demonstrate, the amount of drying should be much closer to about 48 hours than about 4 hours, in order to achieve an essentially dry blended compound prior to molding, i.e., having a moisture content of less than 0.1%. To reduce the possibility of drying at a temperature approaching the heat deflection temperature of 60° C., the temperature can be up to about 60° C. without vacuum. Indeed, without undue experimentation, one can identify the best combination of time, temperature, and atmospheric pressure to reduce the time of drying while maximizing the amount of drying, without approaching a temperature which would degrade or otherwise affect performance of the compound shaped as a molded or extruded product.

Usefulness of the Invention

Any plastic article is a candidate for use of the compounds of the present invention. With the heat durability of PLA now achieved, all types of plastic articles which required an elevated HDT (and preferably a HDT of at least 60° C. at 66 psi), previously made from fossil-derived polymers, can now be made from a sustainable PLA polymer compound.

Plastic articles made from compounds of the present invention can be shaped via molding or extruding for use in the transportation, appliance, electronics, building and construction, biomedical, packaging, and consumer markets.

For example, food packaging can now be made from a PLA compound of the present invention and retain sufficient heat resistance to withstand storage or transport at temperatures approaching 60° C. The plastic article made from a compound of the present invention will retain its structural integrity at least 5° C. higher than with PLA alone and preferably at temperatures below 60° C.

Examples prove the unexpected nature of the present invention.

EXAMPLES

Comparative Examples A-N and Examples 1-29

These examples demonstrate the several failures of particular combinations of non-halogenated, phosphorus-containing flame retardants and other non-halogenated flame retardants to arrive at the alternative combinations of compounds which are acceptable for the present invention.

Table 2 shows the list of ingredients. Table 3 shows the extruder conditions. Table 4 shows the processing conditions. Table 5 shows the molding conditions. Tables 6-11 show the recipes and the UL 94 flame retardance, Notched Izod impact according to ASTM D-256, and HDT at 66 psi according to ASTM D648.

A "no rating" identified as "NR" in the Tables for the UL 94 flame retardance is a failure.

TABLE 3

| Product | Purpose | Chemistry | Company Source |
|---|---|---|---|
| PC Makrolon ® 1239 | To blend with PLA to improve properties | Polycarbonate | Bayer |
| CALIBRE ™ 1060 DVD POLYCARBONATE RESIN | To blend with PLA to improve properties | Polycarbonate | Dow Chemical |
| INGEO ™ 4032D | Bio content | Polylactic acid | Natureworks LLC |
| TEFLON ™ 6C | Drip Suppressant | PTFE | DuPont |
| Joncryl ®ADR 4300 | Chain Extender | Epoxy-functional Styrene Acrylic copolymers | BASF |
| Zinc Borate (FireBrake ®) | FR synergist | $2ZnO:3B_2O_3:3.5 H_2O$ | Borax |
| METABLEN ® S-2030 | Impact modifier | Silicon Core Shell impact modifier | Mitsubishi Rayon, Inc. |

TABLE 3-continued

| Product | Purpose | Chemistry | Company Source |
|---|---|---|---|
| TECHMASTER ®710021 | Pigment concentrates for polymer | Black Color Concentrate | Tech Blend S.E.C. |
| REOFOS ® RDP | Flame Retardant | Aromatic Oligomeric Phosphates | Great Lakes Chemical |
| SPB 100 | Flame Retardant | Polyphosphazene | Otsuka |
| Joncryl ®ADR 4368 | China Extender | Epoxy Functional Styrene-Acrylate Oligomer | BASF |
| Talc (UltraTalc ® 609) | Filler | a mineral composed of hydrated magnesium silicate | Specialty Minerals |
| Talc Mistron ® Vapor-R | Filler | a mineral composed of hydrated magnesium silicate | Luzenac America, Inc. |
| FRX CO 45 POLYPHOSPHONATE COPOLYMER | Flame Retardant | Copolymer of polycarbonate and polyphosphonate | FRX Polymers |
| AFLAMMIT ® PCO 960 | Flame Retardant | pentaerythritol spirobis (methylphosphonate) | THOR |
| Melamine Cyanurate | Flame Retardant/ Synergist | Melamine Cyanurate | Hangzhou JLS Flame Retardants Chemical Co., Ltd. |
| Bayowet ® masterbatch | Charring agent for Polycarbonate | Perfluoro alkyl sulfonate Salt Masterbatch, Polycarbonate is the carrier | Lanxess |
| SPB-L | Flame Retardant | Polyphosphazene | Otsuka |
| WSFR-PX220 | Flame Retardant | Bisphosphate ester | Zhejiang Wansheng Co. Ltd |
| Phoslite ™ B85AX | Flame Retardant | Metal hypophosphite(s) | Italmatch |
| Paraloid ™ KM 334 | Impact Modifier | Acrylic polymer | Rohm & Haas |

TABLE 4

Extruder Conditions
All Comparative Examples and Examples

| | |
|---|---|
| Pre-Extruder Drying | PLA, FRX CO45, and Polycarbonate resin and AFLAMMIT ® PCO 960 material was dried at 80° C. overnight to 0.02% moisture prior to extrusion |
| Extruder Type | Leistritz 18 mm Counter-Rotating Twin Screw Extruder |
| Order of Addition | All ingredients mixed together and fed into the extruder hopper except formulations with RDP and SPB-L. SPB-L and RDP were fed downstream using a liquid feeder. |

Process Parameters
Run Rate (kg/hr): 6.82

| Conditions | Set | Actual |
|---|---|---|
| Zone 2 Temp (° C.): | 230 | 230 |
| Zone 3 Temp (° C.): | 230 | 230 |
| Zone 4 Temp (° C.): | 230 | 230 |
| Zone 5 Temp (° C.): | 230 | 230 |
| Zone 6 Temp (° C.): | 230 | 230 |
| Zone 7 Temp (° C.): | 230 | 230 |
| Zone 8 Temp (° C.): | 230 | 230 |
| Zone 9 Temp (° C.): | 230 | 230 |
| Die Temp (° C.): | 230 | 230 |
| Screw Speed (RPM) | | 400 |
| Vacuum (mm of Hg) | | 187.5 |
| Melt Temp (Hand Probe) (° C.): | | 235 |
| Die Pressure (mPa) | | 4.8 |
| Torque (%) | | 30~45 |
| Water Bath | | 20~30% Submerged |

TABLE 4-continued

Extruder Conditions
All Comparative Examples and Examples

| | |
|---|---|
| Pelletizer # | N/A |
| Pelletize Blade Speed (RPM) | 600 |
| Feed Roller Speed (RPM) | 300 |
| Classifier # | N/A |

TABLE 5

Molding Conditions
All Comparative Examples and Examples
120 ton DeMag molding machine

Drying Conditions before Molding:

| | |
|---|---|
| Temperature (° C.) | 60 |
| Time (h) | 10-12 |

Temperatures:

| | |
|---|---|
| Nozzle (° C.) | 215~226 |
| Zone 1 (° C.) | 210~226 |
| Zone 2 (° C.) | 204~221 |
| Zone 3 (° C.) | 204~215 |
| Mold (° C.) | 49~65.5 |
| Oil Temp (° C.) | 29 |

Speeds:

| | |
|---|---|
| Screw RPM (%) | 29 |
| % Shot - Inj Vel Stg 1 | 10 |
| % Shot - Inj Vel Stg 2 | 15 |

TABLE 5-continued

Molding Conditions
All Comparative Examples and Examples
120 ton DeMag molding machine

| | |
|---|---|
| % Shot - Inj Vel Stg 3 | 18 |
| % Shot - Inj Vel Stg 4 | 20 |
| % Shot - Inj Vel Stg 5 | 20 |
| Pressures: | |
| Hold Stg 1 (mPa) - Time(sec) | 4.85 |
| Hold Stg 2 (mPa) - Time(sec) | N/A |
| Timers: | |
| Injection Hold (sec) | N/A |
| Cooling Time (sec) | 15 |
| Operation Settings: | |
| Shot Size (mm) | 30 |
| Cushion (mm) | 6 |

TABLE 6

| | Example No. | | | | | | | |
|---|---|---|---|---|---|---|---|---|
| | A | B | C | D | E | F | G | H |
| PC Makrolon ® 1239 | | | 44 | 58.98 | 53.98 | 49.8 | 39 | 44 |
| CALIBRE ™ 1060 DVD POLYCARBONATE RESIN | 44.8 | 44 | | | | | | |
| INGEO ™ 4032D | 30 | 30 | 30 | 29.98 | 29.98 | 30 | 30 | 30 |
| TEFLON ™ 6C (refrigerated) | 0.7 | 1.5 | 1.5 | 0.70 | 0.70 | 0.7 | 1.5 | 1.5 |
| Joncryl ® ADR 4300 | 0.5 | 0.5 | 0.5 | 0.50 | 0.50 | 0.5 | 0.5 | 0.5 |
| Zinc Borate (FireBrake ®) | | | | | | | | |
| METABLEN ® S-2030 | 9 | 9 | 9 | 9.00 | 9.00 | 9 | 9 | 7 |
| TECHMASTER ® 710021 | | | | | | | | |
| REOFOS ® RDP | 15 | 15 | 15 | | | | 20 | |
| SPB 100 | | | | | | | | 15.00 |
| AFLAMMIT ® PCO 960 | | | | 5.00 | 10.00 | | | |
| Melamine Cyanurate | | | | | | | | 2.0 |
| Bayowet ® masterbatch | | | | 0.84 | 0.84 | | | |
| Total | 100.00 | 100.00 | 100.00 | 100.00 | 100.00 | 100.00 | 100.00 | 100.00 |
| Testing | | | | | | | | |
| HDT @ 66 psi (C.) | 72 | 70 | 70 | 128 | 104 | 83 | 53 | 87 |
| Notched Izod Impact (ft-lb/in) | 1.5 | 1.6 | 6.7 | 20.5 | 17.6 | 1.9 | 2.0 | 9.4 |
| UL94 rating (3.2 mm) | V-0 | V-0 | V-0 | NR | NR | V-1 | V-0 | V-0 |
| UL94 rating (1.6 mm) | NR | NR | NR | NR | NR | NR | V-0 | NR |
| UL94 rating (0.8 mm) | NR | NR | NR | NR | NR | NR | NR | NR |

TABLE 7

| | Example No. | | | | | | | |
|---|---|---|---|---|---|---|---|---|
| | 1 | 2 | 3 | 4 | 5 | 6 | 7 | I |
| PC Makrolon ® 1239 | 44 | 34 | 24 | 7 | 44.8 | 44 | 44.8 | 44.8 |
| INGEO ™ 4032D | 30 | 30 | 30 | 30 | 30 | 30 | 30 | 30 |
| TEFLON ™ 6C (refrigerated) | 1.5 | 1.5 | 1.5 | 1.5 | 0.7 | 1.5 | 0.7 | 0.7 |
| Joncryl ® ADR 4300 | 0.5 | 0.5 | 0.5 | 0.5 | 0.5 | 0.5 | 0.5 | 0.5 |
| Zinc Borate (FireBrake ®) | 2.00 | | | | 2.00 | 2.00 | 5.00 | 7.00 |
| METABLEN ® S-2030 | 7 | 9 | 9 | 9 | 5 | 5 | 5 | 5 |
| TECHMASTER ® 710021 | | | | | 2.00 | 2.00 | 2.00 | 2.00 |
| REOFOS ® RDP | | 15 | 15 | 10 | | | | |
| SPB 100 | 15.00 | | | | 15.00 | 15.00 | 12.00 | 10.00 |
| FRX CO 45 POLYPHOSPHONATE COPOLYMER | | 10 | 20 | 42 | | | | |
| Total | 100.00 | 100.00 | 100.00 | 100.00 | 100.00 | 100.00 | 100.00 | 100.00 |
| Testing | | | | | | | | |
| HDT @ 66 psi (C.) | 86 | 62 | 60 | 72 | 87 | 89 | 88 | 89 |
| Notched Izod Impact (ft-lb/in) | 5.7 | 2.3 | 2.0 | 2.0 | 8.8 | 3.0 | 2.5 | 2.2 |
| UL94 rating (3.2 mm) | V-0 | V-0 | V-0 | V-0 | V-0 | V-0 | V-0 | V-0 |
| UL94 rating (1.6 mm) | V-0 | V-0 | V-0 | V-0 | V-0 | V-0 | V-0 | NR |
| UL94 rating (0.8 mm) | NR | NR | V-1 | V-1 | NR | NR | NR | NR |

TABLE 8

| | Example No. | | | | | | | |
|---|---|---|---|---|---|---|---|---|
| | 8 | 9 | J | K | 10 | 11 | 12 | L |
| PC Makrolon ® 1239 | 44.8 | 44.8 | 54.3 | 47.3 | 45.3 | 45.1 | 45.1 | 46.8 |
| INGEO ™ 4032D | 30 | 30 | 30 | 30 | 30 | 30 | 30 | 30 |
| TEFLON ™ 6C (refrigerated) | 0.7 | 0.7 | 0.7 | 0.7 | 0.7 | 0.7 | 0.7 | 0.7 |
| Joncryl ® ADR 4300 | 0.5 | 0.5 | | | | | 0.2 | 0.5 |
| Zinc Borate (FireBrake ®) | 2.00 | 2.00 | | | 2.00 | 2.00 | 2.00 | |
| METABLEN ® S-2030 | 5 | 5 | | 5 | 5 | 5 | 5 | 5 |
| TECHMASTER ® 710021 | 2.00 | 2.00 | | 2.00 | 2.00 | 2.00 | 2.00 | 2.00 |
| REOFOS ® RDP | 5 | 10 | | | | | | |
| SPB 100 | 10.00 | 5.00 | 15.00 | 15.00 | 15.00 | 15.00 | 15.00 | 15.00 |
| Joncryl ® ADR 4368 | | | | | | 0.2 | | |
| Total | 100.00 | 100.00 | 100.00 | 100.00 | 100.00 | 100.00 | 100.00 | 100.00 |
| Testing | | | | | | | | |
| HDT @ 66 psi (C.) | 85 | 70 | 92 | 85 | 87 | 88 | 88 | 90 |
| Notched Izod Impact (ft-lb/in) | 2.8 | 2.0 | 0.9 | 12.7 | 4.5 | 6.8 | 6.5 | 14.1 |
| UL94 rating (3.2 mm) | V-0 | V-0 | V-0 | V-0 | V-0 | V-0 | V-0 | V-0 |
| UL94 rating (1.6 mm) | V-0 | V-1 | NR | NR | V-1 | V-0 | V-1 | NR |
| UL94 rating (0.8 mm) | NR | NR | NR | NR | NR | NR | NR | NR |

TABLE 9

| | Example No. | | | | | | |
|---|---|---|---|---|---|---|---|
| | 13 | 14 | 15 | M | 16 | 17 | 18 |
| PC Makrolon ® 1239 | 44.8 | 44.8 | 43.3 | 45.3 | 45.3 | 45.3 | 45.3 |
| INGEO ™ 4032D | 30 | 30 | 30 | 30 | 30 | 30 | 30 |
| TEFLON ™ 6C (refrigerated) | 0.7 | 0.7 | 0.7 | 0.7 | 0.7 | 0.7 | 0.7 |
| Joncryl ® ADR 4300 | 0.5 | 0.5 | | | | | |
| Zinc Borate (FireBrake ®) | 2.00 | 2 | 2 | | | | |
| METABLEN ® S-2030 | 5 | 5 | 5 | 5 | 5 | 5 | 5 |
| TECHMASTER ® 710021 | 2.00 | 2 | 2 | 2 | 2 | 2 | 2 |
| REOFOS ® RDP | | | | | 5 | 10 | 10 |
| SPB 100 | 15.00 | 15 | 15 | 15 | 10 | 5 | 5 |
| Talc (UltraTalc ® 609) | | | | | | | 2.00 |
| Talc Mistron ® Vapor-R | | | 2.00 | 2.00 | 2.00 | 2.00 | |
| Total | 100.00 | 100.00 | 100.00 | 100.00 | 100.00 | 100.00 | 100.00 |
| Testing | | | | | | | |
| HDT @ 66 psi (C.) | 89 | 86 | 83 | 81 | 78 | 74 | 70 |
| Notched Izod Impact (ft-lb/in) | 8.8 | 10.0 | 2.0 | 5.3 | 3.0 | 2.1 | 2.5 |
| UL94 rating (3.2 mm) | V-0 | V-0 | V-0 | V-0 | V-0 | V-0 | V-0 |
| UL94 rating (1.6 mm) | V-0 | V-0 | V-0 | NR | V-0 | V-0 | V-0 |
| UL94 rating (0.8 mm) | NR | NR | NR | NR | NR | NR | NR |

TABLE 10

| | Example No. | | | | | | | | |
|---|---|---|---|---|---|---|---|---|---|
| | N | 19 | 20 | 21 | 22 | 23 | 24 | 25 | 26 |
| PC Makrolon ® 1239 | | | | | | | | 44.8 | 44.8 |
| INGEO ™ 4032D | 30 | 30 | 30 | 30 | 30 | 30 | 30 | 30 | 30 |
| TEFLON 6C (refrigerated) | 0.7 | 0.7 | 0.7 | 0.7 | 0.7 | 0.7 | 0.7 | 0.7 | 0.7 |
| Joncryl ® ADR 4300 | 0.5 | 0.5 | 0.5 | 0.5 | 0.5 | 0.5 | 0.5 | 0.5 | 0.5 |
| Zinc Borate (FireBrake ®) | | | | | 2 | 2 | | 2 | 2 |
| METABLEN ® S-2030 | 5.2 | 5.2 | 5.2 | 5.2 | 5.2 | 5.2 | 5.2 | 5 | 5 |
| TECHMASTER ® 710021 | 2 | 2 | 2 | 2 | 2 | 2 | 2 | 2 | 2 |
| SPB 100 | | 5 | 10 | 5 | 10 | | | | 10 |
| FRX CO 45 POLYPHOSPHONATE COPOLYMER | 61.6 | 56.6 | 51.6 | 54.6 | 49.6 | 56.6 | 51.6 | | |
| SPB-L | | | | | | 5.00 | 10.00 | 15.00 | |
| WSFR PX-220 | | | | | | | | | 5 |
| Total | 100.00 | 100.00 | 100.00 | 100.00 | 100.00 | 100.00 | 100.00 | 100.00 | 100.00 |
| Testing | | | | | | | | | |
| HDT @ 66 psi (C.) | 110 | 98 | 88 | 98 | 86 | 90 | 81 | 79 | 82 |
| Notched Izod Impact (ft-lb/in) | 8.5 | 2.2 | 1.3 | 1.7 | 1.5 | 1.2 | 1.1 | 6.7 | 4.8 |

TABLE 10-continued

| | Example No. | | | | | | | | |
|---|---|---|---|---|---|---|---|---|---|
| | N | 19 | 20 | 21 | 22 | 23 | 24 | 25 | 26 |
| UL94 rating (3.2 mm) | V-0 | V-0 | V-0 | V-0 | V-0 | V-0 | V-0 | V-0 | V-0 |
| UL94 rating (1.6 mm) | V-0 | V-0 | V-0 | V-0 | V-0 | V-0 | V-0 | V-0 | V-0 |
| UL94 rating (0.8 mm) | NR | V-0 | V-0 | NR | NR | V-0 | V-0 | NR | NR |

TABLE 11

| Example No. | 27 | 28 | 29 |
|---|---|---|---|
| PC Makrolon ® 1239 | 63.5 | 58.5 | 53.5 |
| INGEO ™ 4032D | 30 | 30 | 30 |
| TEFLON 6C (refrigerated) | 0.5 | 0.5 | 0.5 |
| Joncryl ® ADR 4300 | 1 | 1 | 1 |
| Phoslite ™ B85AX | 5 | 10 | 10 |
| Paraloid ™ KM 334 | | | 5 |
| Total | 100.00 | 100.00 | 100.00 |
| Testing | | | |
| HDT @ 66 psi (C.) | 132 | 126 | 125 |
| Notched Izod Impact (ft-lb/in) | 1.7 | 1.7 | 1.7 |
| UL 94 rating (3.2 mm) | V-0 | V-0 | V-0 |
| UL94 rating (1.6 mm) | V-1 | V-0 | V-0 |
| UL94 rating (0.8 mm) | NR | V-0 | V-0 |

The requirement of acceptability is a HDT of at least 60° C. and a V-0 rating at 3.2 mm thickness and either a V-0 or a V-1 rating at 1.6 mm thickness, with a preference for a V-0 rating at 1.6 mm thickness. The experiments yielded Comparative Examples A-L and Examples 1-22. The experiments were reported chronologically, except Examples 27-29 which were conducted after Example 13 and before Example 14. All experiments used 30 weight percent of PLA, at a "significant component" level as defined above.

Comparative Examples A-F demonstrated that use of RDP of at least 15 weight percent could achieve a V-0 rating at 3.2 mm thickness (Comp. Examples A-C), whereas no flame retardant (Comp. Example D) or use of Aflammit® PCO 960 flame retardant at either 5 or 10 weight percent (Comp. Examples E or F) did not. The results were not affected by the type of PC employed (Comp. Examples A and B vs. C).

Comparative Example G would have been an acceptable formulation, which used 20 weight percent of RDP, compared with Comparative Example C, but the HDT value was unacceptably as low as PLA itself or even lower.

Comparative Example H and Example 1 compared the use of SPB 100 with either melanine cyanurate or zinc borate, respectively, with the latter providing both an acceptable HDT and V-0 results at both 3.2 mm and 1.6 mm thicknesses.

Examples 2-4 studied the acceptable performance of the use of varying amounts of RDP and polyphosphonate-co-carbonate as the flame retardant components. The amount of RDP ranged from 10-15 weight percent while the amount of polyphosphonate-co-carbonate ranged from 10-42 weight percent.

Examples 5-9 and Comparative Example I studied the acceptable performance of SPB 100 with other ingredients. All of Examples 5-9 had less than 7 weight percent of zinc borate. All of Examples 5-7 had more than 10 weight percent of SPB 100. The trio of Comparative Example I and Examples 8 and 9 demonstrated that if SPB 100 were to be used at 10 weight percent or less, the amount of RDP needed to be at least 5 weight percent and preferably 10 weight percent.

Comparative Examples J-L, as compared with Examples 10-12, demonstrated that if the carbonate polymer is the conventional polycarbonate polymer, then the absence of zinc borate results in unacceptable formulations.

Examples 13-15 (Examples 13 and 14 being the same formulation) explored the addition of talc in Example 15 which reduced Notched Izod impact.

Comparative Example M and Example 16 demonstrated that the absence of zinc borate yielded an unacceptable UL Rating at 1.6 mm thickness.

Examples 16-18 demonstrated that if the amount of SPB 100 is 10 weight percent of the compound or less and RDP is present, then talc alone can be used with the conventional polycarbonate polymer to yield acceptable HDT and flame ratings.

Comparative Example N was a successful result of a prior invention, serving in this application as a control. Examples 19-22 demonstrated that the addition of SPB 100 in amounts of 10 weight percent or less with polyphosphonate-co-carbonate resulted in V-0 flame retardant ratings for both 3.2 and 1.6 mm and even 0.8 mm for Examples 19 and 20 without either zinc borate or talc being used as inorganic synergists. The results of Examples 19 and 20 were duplicated using the SPB-L polyphosphazene in Examples 23 and 24. Example 25 duplicated the results of Example 14 also using SPB-L polyphosphazene for flame retardance, though HDT was reduced in Example 15 compared with Example 14.

Example 26 demonstrated that a different type of bisphosphate ester also yielded acceptable results.

Examples 27-29 demonstrated that a different type of non-halogenated flame retardant, a metal hypophosphite, also yielded acceptable results, although the Notched Izod impact toughness was not as robust as other Examples.

The aggregation of these 14 Comparative Examples and 29 Examples provides to a person having an ordinary skill in the art, without undue experimentation, a plan of variations in choices of carbonate polymer, flame retardant, and inorganic synergist, if needed, to permit that person to select a successful flame retardant compound in which PLA is a significant component according to ultimate thickness of V-0 UL flame retardance; HDT; and impact toughness, as well as cost, depending on the availability and price of the various non-halogenated flame retardants.

The invention is not limited to the above embodiments. The claims follow.

What is claimed is:

1. A heat resistant, flame retardant polylactic acid compound, consisting of:
 (a) from about 30 to about 39 weight percent, by weight of the compound, of polylactic acid;
 (b) a carbonate polymer selected from the group consisting of
  (i) polycarbonate,
  (ii) polyphosphonate-co-carbonate, and
  (iii) a combination of them;

(c) a non-halogenated flame retardant selected from the group consisting of polyphosphates, phosphinates, polyphosphonates, phosphonates, phosphates, polyphosphonites, phosphonite salts, hypophosphite, hypophosphinite, phosphonite, phosphite, phosphorus oxide, phosphoramide, phosphoramidate, phosphorus nitrile, phospham, phosphoryl nitrile, phosphorus nitride amide, imidophosphazene, polyphosphazene, phosphazene, phosphorus oxynitride, organophosphates, red phosphorus, and combinations thereof;

(d) a fluoropolymer drip suppressant;

(e) optionally, an inorganic synergist selected from the group consisting of zinc borate, talc, and a combination of them;

(f) optionally, a core/shell siloxane/(meth)acrylate copolymer impact modifier;

(g) optionally, a oligomeric chain extender; and (h) optionally, one or more other additives selected from the group consisting of adhesion promoters; anti-fogging agents; anti-static agents; biocides; bonding, blowing and foaming agents; dispersants; initiators; lubricants; pigments, colorants and dyes; plasticizers; processing aids; release agents; slip and anti-blocking agents; stearates; ultraviolet light absorbers; viscosity regulators; waxes; and combinations of them;

wherein the compound when molded into a plastic article has a UL 94 rating of V-0 when tested at a 3.2 mm thickness.

2. The compound of claim 1, wherein the polyphosphonate-co-carbonate is formed from at least one phosphonate oligomer or polyphosphonate block covalently linked to polycarbonate, wherein the covalent linkages are between the at least one phosphonate oligomer or polyphosphonate and the polycarbonate to provide a copolymer having a single glass transition temperature (Tg); and wherein the polyphosphonate-co-carbonate has a weight average molecular weight ranging from about 30,000 to about 50,000.

3. The compound of claim 2, wherein the phosphonate oligomer or polyphosphonate block has the structure of

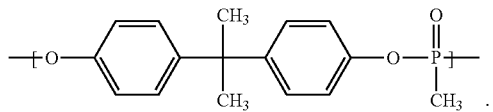

4. The compound of claim 3, wherein the polyphosphonate-co-carbonate is a blend of two different polyphosphonate-co-carbonates.

5. The compound of claim 1, wherein if the blended compound is essentially dried before shaping into a plastic article, then the blended compound after shaping into the plastic article has a heat deflection temperature of at least 60° C. at 66 pounds per square inch using the protocol of ASTM D648.

6. The compound of claim 1, wherein the polylactic acid comprises poly-D-lactide, poly-L-lactide, or a combination of both.

7. The compound of claim 1, wherein the oligomeric chain extender is present in the compound from about 0.25 to about 2 weight percent.

8. The compound of claim 1, wherein the impact modifier is present.

9. The compound of claim 1, wherein the drip suppressant is polytetrafluoroethylene.

10. The compound of claim 1, wherein the non-halogenated flame retardant is an organophosphate, and the organophosphate is resorcinol bis (diphenyl phosphate).

11. A plastic article shaped from the compound of claim 1.

12. The article of claim 11, wherein the article is molded or extruded and wherein the article is shaped for use in transportation, appliance, electronics, building and construction, packaging, or consumer markets.

13. The article of claim 10, wherein the article has a heat deflection temperature increase of at least 5° C. more than the heat deflection temperature of a plastic article made of polylactic acid alone, when both are measured at 66 pounds per square inch using the protocol of ASTM D648.

14. The article of claim 13, wherein the article has a UL 94 rating of V-0 or V-1 when tested at a 1.6 mm thickness.

15. The compound of claim 1, wherein the optional inorganic synergist is present and is:

(a) zinc borate, and wherein (i) the carbonate polymer is polycarbonate, the non-halogenated flame retardant is present in an amount of more than 10 weight percent by weight of the compound, and the oligomeric chain extender is present; or (ii) the carbonate polymer is polyphosphonate-co-carbonate and the non-halogenated flame retardant is present in an amount of 10 weight percent or less by weight of the compound; or (b) talc, and wherein the carbonate polymer is polycarbonate, the non-halogenated flame retardant comprises a combination of polyphosphazene and an organophosphate that is a bisphosphate ester, and the non-halogenated flame retardant is present in an amount of more than 10 weight percent by weight of the compound; or (c) a combination of zinc borate and talc, and wherein the carbonate polymer is polycarbonate, the non-halogenated flame retardant is present in an amount of more than 10 weight percent by weight of the compound, and the oligomeric chain extender is absent from the compound.

16. The compound of claim 1, wherein the optional inorganic synergist is not present, and wherein the carbonate polymer is polyphosphonate-co-carbonate, the non-halogenated flame retardant is polyphosphazene and is present in an amount of 10 weight percent or less by weight of the compound, and the compound when molded into a plastic article has a UL 94 rating of V-0 when tested at a 0.8 mm thickness.

17. A heat resistant, flame retardant polylactic acid compound, consisting of:

(a) from about 30 to about 39 weight percent, by weight of the compound, of polylactic acid;

(b) a carbonate polymer selected from the group consisting of
(i) polycarbonate,
(ii) polyphosphonate-co-carbonate, and
(iii) a combination of them;

(c) a non-halogenated flame retardant selected from the group consisting of polyphosphates, phosphinates, polyphosphonates, phosphonates, phosphates, polyphosphonites, phosphonite salts, hypophosphite, hypophosphinite, phosphonite, phosphite, phosphorus oxide, phosphoramide, phosphoramidate, phosphorus nitrile, phospham, phosphoryl nitrile, phosphorus nitride amide, imidophosphazene, polyphosphazene, phosphazene, phosphorus oxynitride, organophosphates, red phosphorus, and combinations thereof;

(d) a fluoropolymer drip suppressant;

(e) optionally, an inorganic synergist selected from the group consisting of zinc borate, talc, and a combination of them;
(f) optionally, a oligomeric chain extender; and
(g) optionally, one or more other additives selected from the group consisting of adhesion promoters; anti-fogging agents; anti-static agents; biocides; bonding, blowing and foaming agents; dispersants; initiators; lubricants; pigments, colorants and dyes; plasticizers; processing aids; release agents; slip and anti-blocking agents; stearates; ultraviolet light absorbers; viscosity regulators; waxes; and combinations of them;

wherein the compound when molded into a plastic article has a UL 94 rating of V-0 when tested at a 3.2 mm thickness.

* * * * *